(12) United States Patent
Rehberg et al.

(10) Patent No.: US 11,807,321 B2
(45) Date of Patent: Nov. 7, 2023

(54) ACTIVE TENSION SYSTEM AND METHOD

(71) Applicant: DEERE & COMPANY, Moline, IL (US)

(72) Inventors: Michael A. Rehberg, Waterloo, IA (US); Nathanael K. Rehn, Waterloo, IA (US); Jeffrey Tott, Waterloo, IA (US); Jeremy P. L'Heureux, Waterloo, IA (US); Daniel J. Garvin, Waterloo, IA (US); Benjamin J. Heimbuch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 215 days.

(21) Appl. No.: 17/192,945

(22) Filed: Mar. 5, 2021

(65) Prior Publication Data

US 2021/0362792 A1 Nov. 25, 2021

Related U.S. Application Data

(60) Provisional application No. 63/028,659, filed on May 22, 2020.

(51) Int. Cl.
  *B62D 55/30* (2006.01)
  *B62D 55/065* (2006.01)
  *B62D 55/12* (2006.01)

(52) U.S. Cl.
  CPC ............ *B62D 55/30* (2013.01); *B62D 55/12* (2013.01); *B62D 55/065* (2013.01)

(58) Field of Classification Search
  CPC .... B62D 55/065; B62D 55/30; B62D 55/305; B62D 55/14; B62D 55/24; B62D 55/116; B62D 55/104

USPC .......................................... 305/144, 145, 153
See application file for complete search history.

(56) References Cited

U.S. PATENT DOCUMENTS

| | | | | |
|---|---|---|---|---|
| 4,840,437 A | * | 6/1989 | Henry | B62D 55/305 305/144 |
| 4,893,883 A | * | 1/1990 | Satzler | B62D 55/30 180/9.1 |
| 5,097,916 A | * | 3/1992 | Brandstadter | B60G 17/04 180/41 |
| 5,316,381 A | * | 5/1994 | Isaacson | B62D 55/305 305/145 |
| 5,390,996 A | * | 2/1995 | Bliss | B62D 55/305 305/152 |
| 6,224,172 B1 | | 5/2001 | Goodwin | |

(Continued)

FOREIGN PATENT DOCUMENTS

| | | |
|---|---|---|
| DE | 60301578 T2 | 6/2006 |
| JP | 10250646 A | 9/1998 |

OTHER PUBLICATIONS

German Search Report issued in application No. DE102021204022.5, dated Dec. 17, 2021, 9 pages.

*Primary Examiner* — Anne Marie M Boehler
(74) *Attorney, Agent, or Firm* — Taft Stettinius & Hollister LLP; Stephen F. Rost (57) ABSTRACT

A work machine may include an idler wheel, a drivable track engaged with the idler wheel, and an actuator configured to move the idler wheel to adjust the tension in the drivable track. A controller may actively instruct the actuator to adjust the tension in the drivable track based on the pressure in the actuator and variables associated with the drivable track and the work machine.

19 Claims, 6 Drawing Sheets

(56) References Cited

U.S. PATENT DOCUMENTS

| | | | |
|---|---|---|---|
| 6,276,768 B1 | 8/2001 | Miller | |
| 7,172,257 B2 | 2/2007 | Tamaru et al. | |
| 10,099,735 B2 | 10/2018 | Vik et al. | |
| 10,640,162 B2 * | 5/2020 | Sauvageau | B62D 55/305 |
| 2005/0029866 A1 * | 2/2005 | Tamaru | B62D 55/305 |
| | | | 305/125 |
| 2014/0265549 A1 * | 9/2014 | Anderfaas | B62D 55/305 |
| | | | 305/145 |
| 2017/0242447 A1 * | 8/2017 | Vik | E02F 9/02 |
| 2020/0114992 A1 | 4/2020 | Edelin et al. | |
| 2022/0049726 A1 * | 2/2022 | Smith | F15B 1/04 |

* cited by examiner

ACTIVE TENSION SYSTEM AND METHOD

RELATED APPLICATIONS

This application claims priority to U.S. Provisional Application Ser. No. 63/028,659, filed May 22, 2020, the disclosure of which is hereby incorporated by reference in its entirety.

FIELD OF THE DISCLOSURE

The present disclosure relates to machinery with a drive assembly, and more particularly to an actuator for use with the drive track of the drive assembly.

BACKGROUND

Work machines and in particular agricultural work machines may have continuous drivable tracks for propelling the work machine. Each drivable track may be in tension. The drivable tracks and the work machine may have various properties or variables associated therewith. At various degrees of tension of the drivable tracks, each variable may contribute to undesired vibrations in the drivable tracks and the work machine. For example, at a certain speed and certain tension, the work machine may experience vibrations.

What is needed therefore is a system and method for identifying the values of the variables associated with the vibrations of the drivable tracks and the work machine. What is also needed is a system and method for adjusting the tension based on the identified values of the variables. What is also needed is a system and method of adjusting the tension actively (i.e. automatically and continuously) and system a method of adjusting the tension of multiple drivable tracks of the work machine.

SUMMARY

In an illustrative embodiment, a work machine includes: a first idler wheel; a drivable track engaged with the first idler wheel; an actuator coupled to the first idler wheel and configured to move the first idler wheel between a first position in which the drivable track experiences a first tension and a second position in which the drivable track experiences a second tension different than the first tension; and a controller configured to send a signal to cause the actuator to move the first idler wheel between the first position and the second position based on: (I) a pressure of the actuator when the idler wheel is in the first position and (II) at least one variable including: (i) the geometry of the drivable track, (ii) the mass of the drivable track, (iii) the tractive load on the work machine; and (iv) the speed of the work machine.

In some embodiments, the work machine includes a second idler wheel positioned rearwardly of the first idler wheel; and a drive sprocket positioned above the first and second idler wheels; wherein the drivable track is engaged with the drive sprocket and the rear idler wheel; and wherein the actuator is configured to move the first idler wheel relative to the drive sprocket and the rear idler wheel.

In some embodiments, the work machine further comprises a pressure output device operatively coupled to the controller, fluidly coupled to the actuator, and configured to measure or adjust the pressure of the actuator.

In some embodiments, the pressure output device is a pressure sensor configured to measure the pressure of the actuator; and wherein the controller is configured to receive a signal from the pressure sensor indicative of the pressure of the actuator.

In some embodiments, the pressure output device is a pressure control valve configured to adjust the pressure of the actuator; wherein the controller is configured to send a signal to the pressure control valve to adjust the pressure of the actuator to a target pressure; and wherein the actuator is at the target pressure when the idler wheel is in the second position.

In some embodiments, the controller is configured to determine a critical pressure based on at least one of the variables including: (i), (ii), (iii), and (iv); and wherein the actuator is at a critical pressure when the idler wheel is in the first position.

In some embodiments, the target pressure is higher than the critical pressure. In some embodiments, the target pressure is lower than the critical pressure.

In another illustrative embodiment, a first drive assembly includes: a first idler wheel: a first drivable track engaged with the first idler wheel; and an first actuator coupled to the first idler wheel and configured to move the first idler wheel through a range of positions, wherein each position of the first idler wheel is associated with a different tension of the first drivable track; and a controller configured to send a signal causing movement of the first actuator which moves the first idler wheel based on a pressure of the first actuator prior to the movement of the first actuator and at least one of: (i) the geometry of the first drivable track, (ii) the mass of the first drivable track, (iii) the tractive load on the work machine; and (iv) the speed of the work machine.

In some embodiments, the work machine includes a second drive assembly including: a second idler wheel: a second drivable track engaged with the second idler wheel; and a second actuator coupled to the second idler wheel and configured to move the second idler wheel through a range of positions, wherein each position of the second idler wheel is associated with a different tension of the second drivable track; and wherein the controller is configured to send a signal causing movement of the second actuator which moves the second idler wheel based on a pressure of the second actuator prior to movement of the second actuator and at least one of: (i) the geometry of the second drivable track, (ii) the mass of the second drivable track, (iii) the tractive load on the work machine; and (iv) the speed of the work machine.

In some embodiments, the pressure of the first actuator is adjustable independently of the pressure of the second actuator. In some embodiments, the first and second drive assemblies are a pair of rearward ground engaging mechanisms. In some embodiments, the first and second drive assemblies are a pair of forward ground engaging mechanisms. In some embodiments, the first drive assembly is a forward ground engaging mechanism and the second drive assembly is a rearward ground engaging mechanism.

In another illustrative embodiment, a method of operating a work machine comprises: determining at least one harmonizing variable including: (i) the geometry of a drivable track of the work machine, (ii) the mass of the drivable track, (iii) the tractive load on the work machine; and (iv) the speed of the work machine; adjusting a tension of the drivable track based on the at least one determined harmonizing variable to prevent vibrations of the work machine.

In some embodiments, adjusting the tension of the drivable track includes extending or retracting an actuator coupled to an idler wheel that is engaged with the drivable track; and wherein extending or retracting an actuator includes adjusting a pressure of the actuator.

In some embodiments, the further includes: determining a critical pressure of the actuator based on the determined at least one harmonizing variable, wherein, at the critical pressure, vibrations of the work machine are induced.

In some embodiments, adjusting the tension in the drivable track includes adjusting the pressure of the actuator to a target pressure that is higher than the critical pressure. In some embodiments, adjusting the tension in the drivable track includes adjusting the pressure of the actuator to a target pressure that is lower than the critical pressure.

In some embodiments, the method further includes determining, continuously, the speed of the work machine; and adjusting the pressure of the actuator if the determined speed of the work machine causes the actuator to be placed at the critical pressure.

In some embodiments, the method further comprises: determining, continuously, the tractive load on the work machine; and adjusting the pressure of the actuator if the determined tractive load on the work machine causes the actuator to be placed at the critical pressure.

In some embodiments, the method further comprises: inputting, with a user control, data associated with the mass of the drivable track and the geometry of the drivable track.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
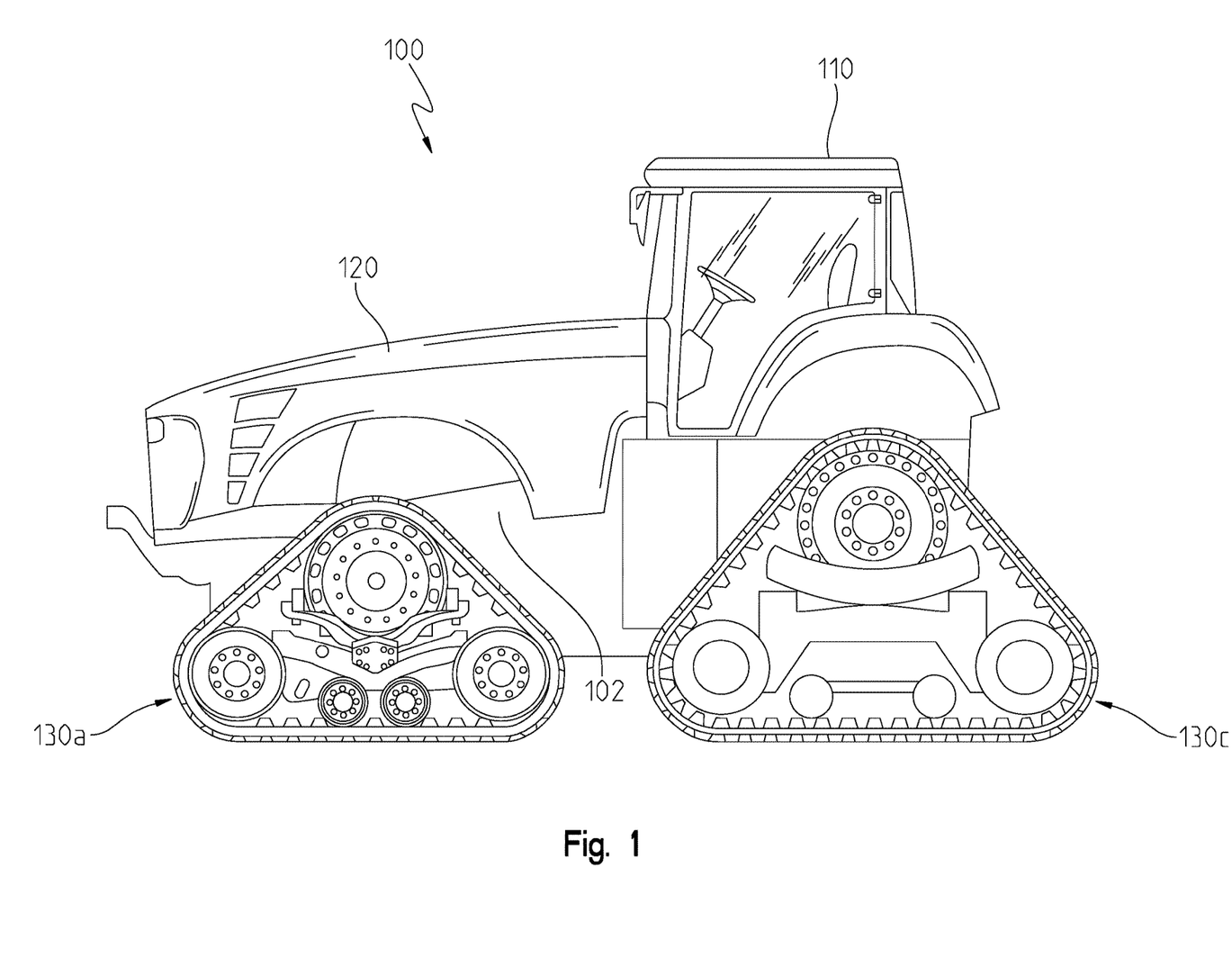
FIG. 1 illustrates a side view of a work machine with drivable tracks.

FIG. 1 illustrates an exemplary work machine 100, in this example a tractor, including a tractor frame 102, an operator cab 110, an engine compartment that holds an engine 120, front drive assemblies 130a, 130b and rear drive assemblies 130c, 130d. The drive assemblies 130a-d may be referred to as undercarriages. FIG. 1 shows only the left side of the work machine 100 with the front drive assembly 130a and the rear drive assembly 130c; however, the right side of the vehicle 100 also includes the front drive assembly 130b and the rear drive assembly 130d. It should be appreciated that reference numbers having a common base number (for example 130a-d) are positioned in different locations on the work machine but function substantially the same in regard to their role in the system and method of active track tensioning, as will be described in greater detail below. It should also be appreciated that any description of a base number alone applies to each component that includes base number in its reference number.

The tractor frame 102 supports the operator cab 110 and engine 120. The drive assemblies 130a-d support the tractor frame 102 above the ground, and provide propelling force to the vehicle 100. The operator cab 110 provides the operator with a clear view of the area being worked by the vehicle 100. The operator cab 110 includes controls for the operator to control the engine 120 and other components of the work machine 100.

Figure 2:
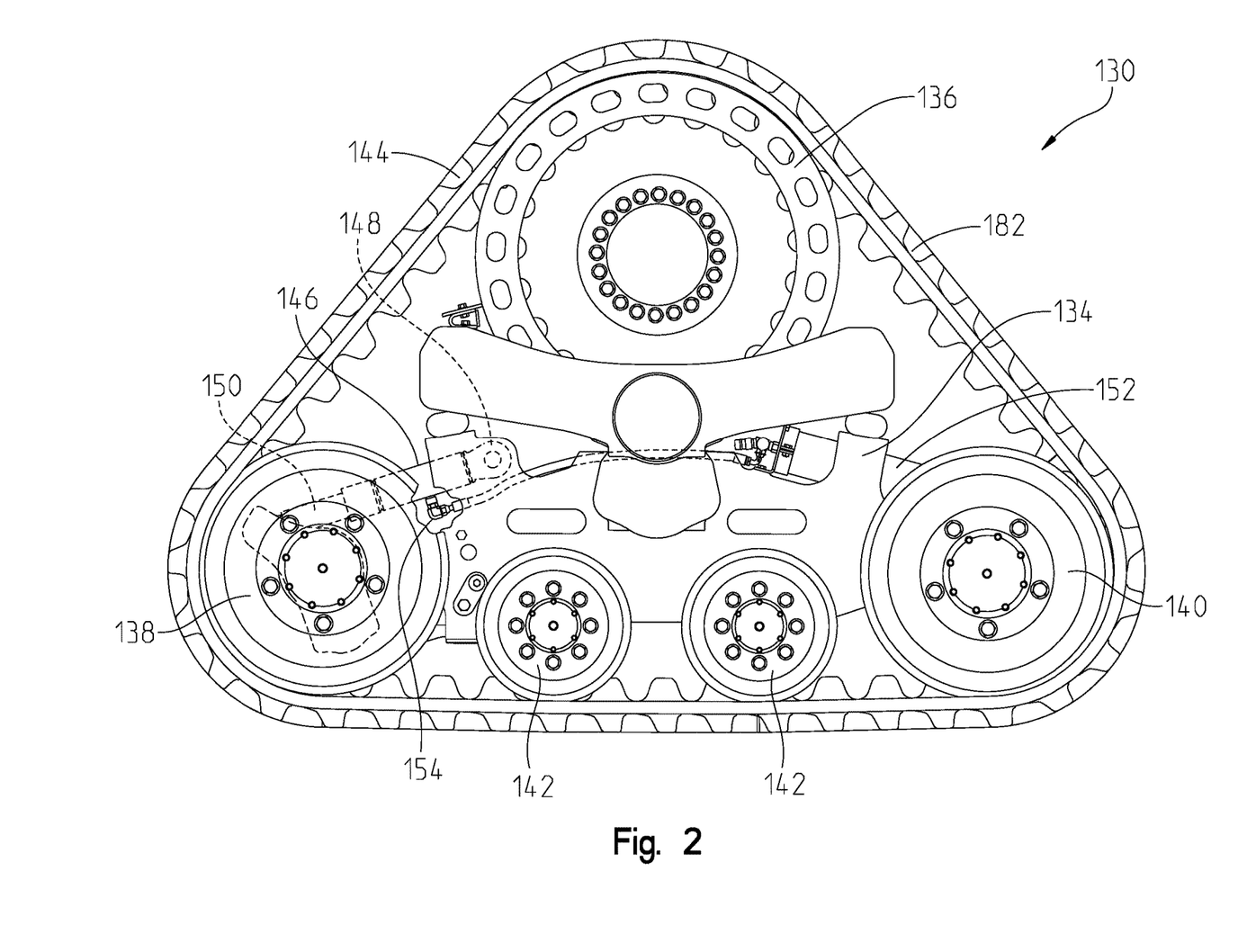
FIG. 2 illustrates a side view of a drive assembly of the work machine including an actuator in phantom coupled to an idler wheel.

FIG. 2 illustrates a side view of a drive assembly 130. The drive assembly 130 includes a drive frame 134, a drive sprocket 136, a front idler wheel 138, a rear idler wheel 140, mid rollers 142, and a drivable track 144. The drivable track 144 may be referred to as a belt. While two mid rollers 142 are illustrated in the example shown in FIG. 2, this disclosure applies to drive assemblies having any number of mid rollers 142 and any arrangement of components within the drive assembly 130. Further, the disclosure applies to any work machine 100 with adjustable, tensioned drivable tracks.

Referring still to FIG. 2, the rear idler wheel 140 is positioned rearwardly of the front idler wheel 138, and the drive sprocket 136 is positioned above the idler wheels 138, 140. The idler wheels 138, 140, the mid rollers 142, and the drive sprocket 136 are coupled to the drive frame 134. Each of the idler wheels 138, 140, the mid rollers 142, and the drive sprocket 136 may engage the drivable track 144 at sections of engagement of the drivable track 144. The sections of engagement define a geometry of the drivable track 144, as described in greater detail below. The drive sprocket 136 is rotatable relative to the drive frame 134 to drive rotation of the drivable track 144 about the drive frame 134 and the components coupled thereto.

As shown in FIG. 2, an actuator 146 is coupled at a first end 148 to the drive frame 134 and a second end 150 to the front idler wheel 138. The actuator 146 may be referred to as a tension cylinder. The second end 150 of the actuator 146 is movable through a range of positions relative to the drive frame 134, the drive sprocket 136, and the rear idler wheel 140. The range of positions of the actuator 146 includes a fully extended position and a fully retracted position. Similarly, the actuator 146 moves the front idler wheel 138 through a range of positions including a fully extended position and a fully retracted position of the front idler wheel 138. As the front idler wheel 138 is moved toward its fully extended position, the tension on the drivable track 144 increases. As the front idler wheel 138 is moved toward its fully retracted position, the tension on the drivable track 144 decreases. It should be appreciated that each position of the front idler wheel 138 is associated with a different tension of the drivable track 144.

Although FIG. 2 shows the actuator 146 coupled to the front idler wheel 138, it should be appreciated that an actuator may be coupled to the rear idler wheel 140 or any other component of the drive assembly 130 engaged with the drivable track 144. Such an actuator may move the component engaged with the drivable track 144 to adjust the tension of the drivable track 144. The description of the active tension system and method herein may be applied to such an actuator or the actuator 146 as described.

As shown in FIG. 2, the actuator 146 is fluidly coupled to an accumulator 152 to optimize the electrohydraulic operation of the actuator 146 and protect the components of the undercarriage in the event of a disruption by debris or uneven ground. The accumulator 152 may be fluidly coupled to a blow off valve or may otherwise have sufficient capacity to absorb an instantaneous pressure increase in the line associated with large debris or sharply uneven ground surfaces.

The actuator 146 may be pressurized or depressurized to move the actuator 146 through its range of positions. A pressure sensor 154 is fluidly coupled to the actuator 146 to measure the pressure of the actuator 146. A controller 180 is operatively coupled to the actuator 146 and the pressure sensor 154 as will be described in greater detail below. The pressure sensor 154 is configured to send signals to the controller 180 indicating the pressure of the actuator 146. The controller 180 is configured to send signals to one or more valves to adjust the position of the actuator 146 as will be described in greater detail below. In some embodiments, the one or more valves are electrically controlled valves of an electrohydraulic system of the work machine 100.

Figure 3:
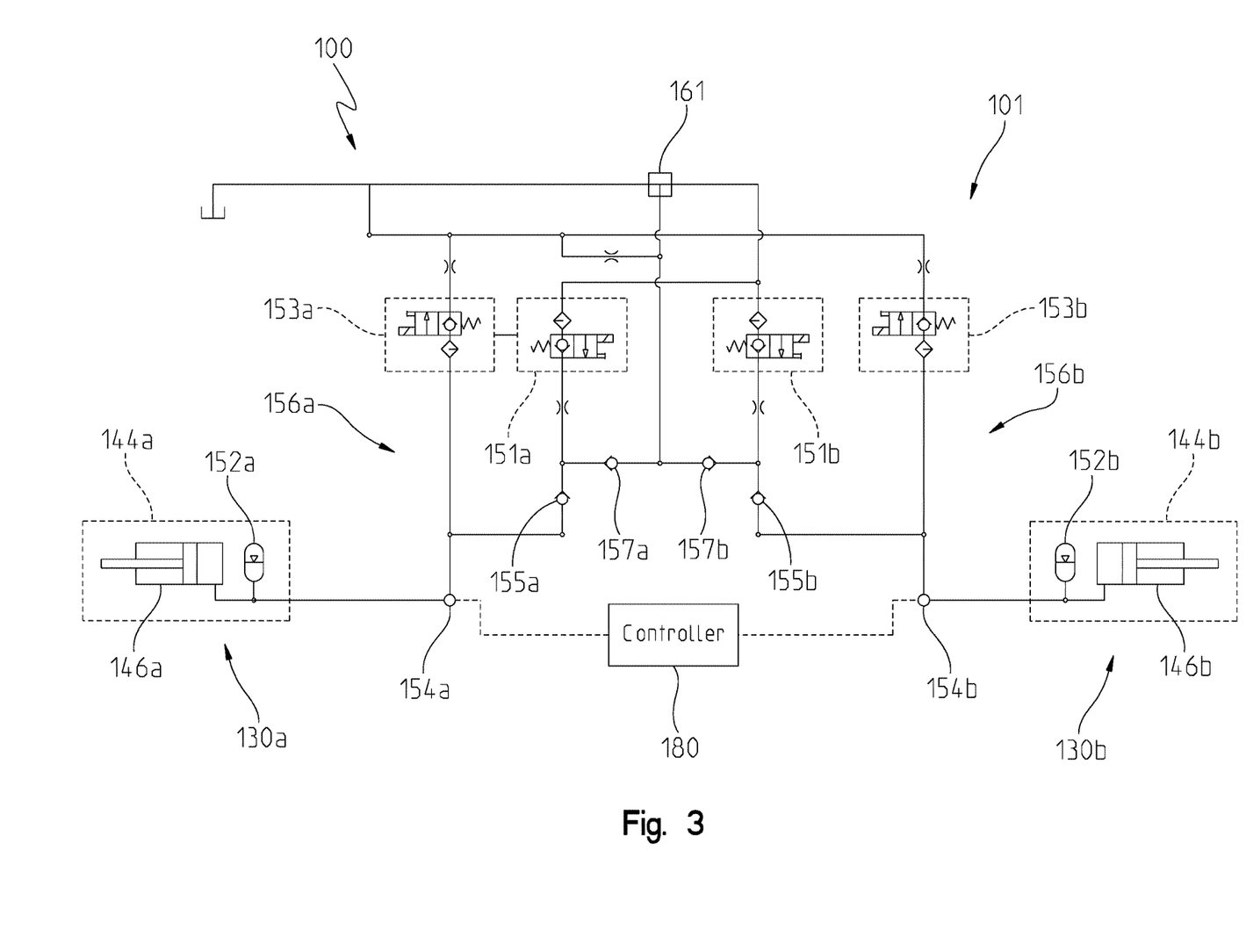
FIG. 3 illustrates a diagrammatic view of an electrohydraulic system for the work machine.

In an illustrative embodiment shown in FIG. 3, the work machine 100 includes first actuator 146a and a second actuator 146b. The first actuator 146a may be associated with an undercarriage on the right side of the work machine 100, and the second actuator 146b may be associated with another undercarriage on the left side of the work machine 100. As shown in an exemplary electrohydraulic arrangement 101, the first actuator 146a is fluidly coupled to a first accumulator 152a and a first pressure sensor 154a, and the second actuator 146b is fluidly coupled to a second accumulator 152b and a second pressure sensor 154b.

As suggested by FIG. 3, the controller 180 may be electrically coupled to valves 151a-b, 153a-b, 155a-b, 157a-b and configured to send signals thereto to open and close the valves. Valve 151a may be opened to increase pressure to the actuator 146a, and valve 153a may be opened to decrease pressure to the actuator 146a. Valve 151b may be opened to increase pressure to the actuator 146b, and valve 153b may be opened to decrease pressure to the actuator 146b.

As shown in FIG. 3, check valve 155a may be opened to facilitate flow to the actuator 146a, and the check valve 157a may be opened facilitate flow to a load sense 161, which may determine the pressure in the line. Similarly, check valve 155b may be opened to facilitate flow to the actuator 146b, and the check valve 157b may be opened to facilitate flow to the load sense 161 to determine the pressure in the line. The load sense 161 is operatively coupled to the controller 180 to send signals to the controller 180 indicative of the pressure in the line.

Further, each valve 151a-b, 153a-b includes a corresponding safety valve configured to be closed to provide a no-leak system. Thus, if a disruption in the line or leak occurs affecting one valve, the affected valve may be isolated from the other valves to maintain hydraulic control of the remaining portions of the work machine 100.

The first actuator 146a and first pressure sensor 154a are included in a first hydraulic circuit 156a associated with a first drive assembly 130a, and the second actuator 146b and second pressure sensor 154b are included in a second hydraulic circuit 156b associated with a second drive assembly 130b. The first and second hydraulic circuits 156a, 156b are fluidly coupled to one another but isolatable from one another via the valves described above. With this arrangement, the first actuator 146a may be adjusted independently of the second actuator 146b, and therefore, the tension on drivable track 144a may adjustable independent of the tension on drivable track 144b.

It should be appreciated that while an exemplary flow diagram is shown only for the front drive assemblies 130a, 130b, a flow diagram having substantially the same functionality is contemplated for the rear drive assemblies 130c, 130d. Accordingly, a third actuator 146c associated with the drivable track 144c may be adjusted independently of a fourth actuator 146d associated with the drivable track 144d. Further, each actuator 146a-d may be adjusted independently of every other actuator 146a-d. Therefore, the tension of each drivable track 144a-d may be adjusted independently from the tension of every other drivable track 144a-d.

It should be appreciated that this disclosure contemplates multiple electrohydraulic arrangements, so long as the electrohydraulic arrangement facilitates independent control of the actuators 146a-d and isolatable flow paths corresponding with each actuator 146a-d.

Figure 4:
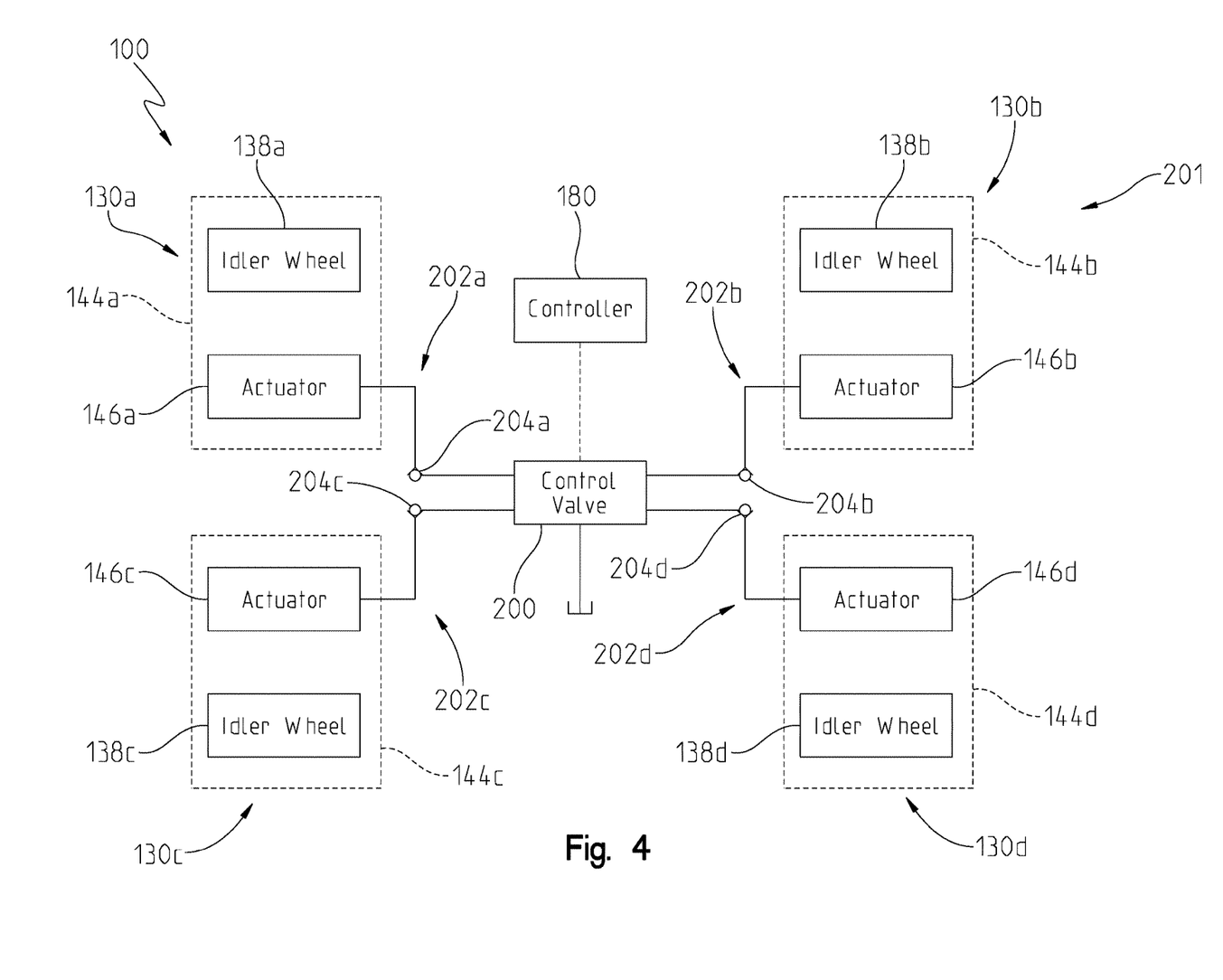
FIG. 4 illustrates a diagrammatic view of another electrohydraulic system for the work machine.

For example, the work machine 100 may include the electrohydraulic arrangement 201 as shown in FIG. 4. The controller 180 is electrically coupled to a control valve 200. The control valve 200 is fluidly and independently coupled to each actuator 146a-d. Each actuator 146a-d is coupled to a corresponding idler wheel 138a-d, and each idler wheel 138a-d is engage with a corresponding drivable track 144a-d. As suggested in FIG. 4, each drive assembly 130a-d is associated with a corresponding hydraulic circuit 202a-d, and each hydraulic circuit 202a-d is isolatable from every other hydraulic circuit 202a-d, at least via check valves 204a-d.

In use, the control valve 200 receives an electrical signal from the controller 180 which causes the control valve 200 to open or close (or partially open or close) based on the electrical signal. The electrical signal corresponds to a target pressure. The pressure of each actuator 146a-d may be increased or decreased to the target pressure by opening the check valve 204a-d that is fluidly coupled to the corresponding actuator 146a-d. The increase or decrease in the pressure of the actuator 146a-d causes the actuator 146a-d to extend or retract which moves the corresponding idler wheel 138a-d from a first position to a second position. Movement of the idler wheel 138a-d from the first position to the second position causes an increase or decrease in the tension of the corresponding drivable track 144a-d.

Figure 5:
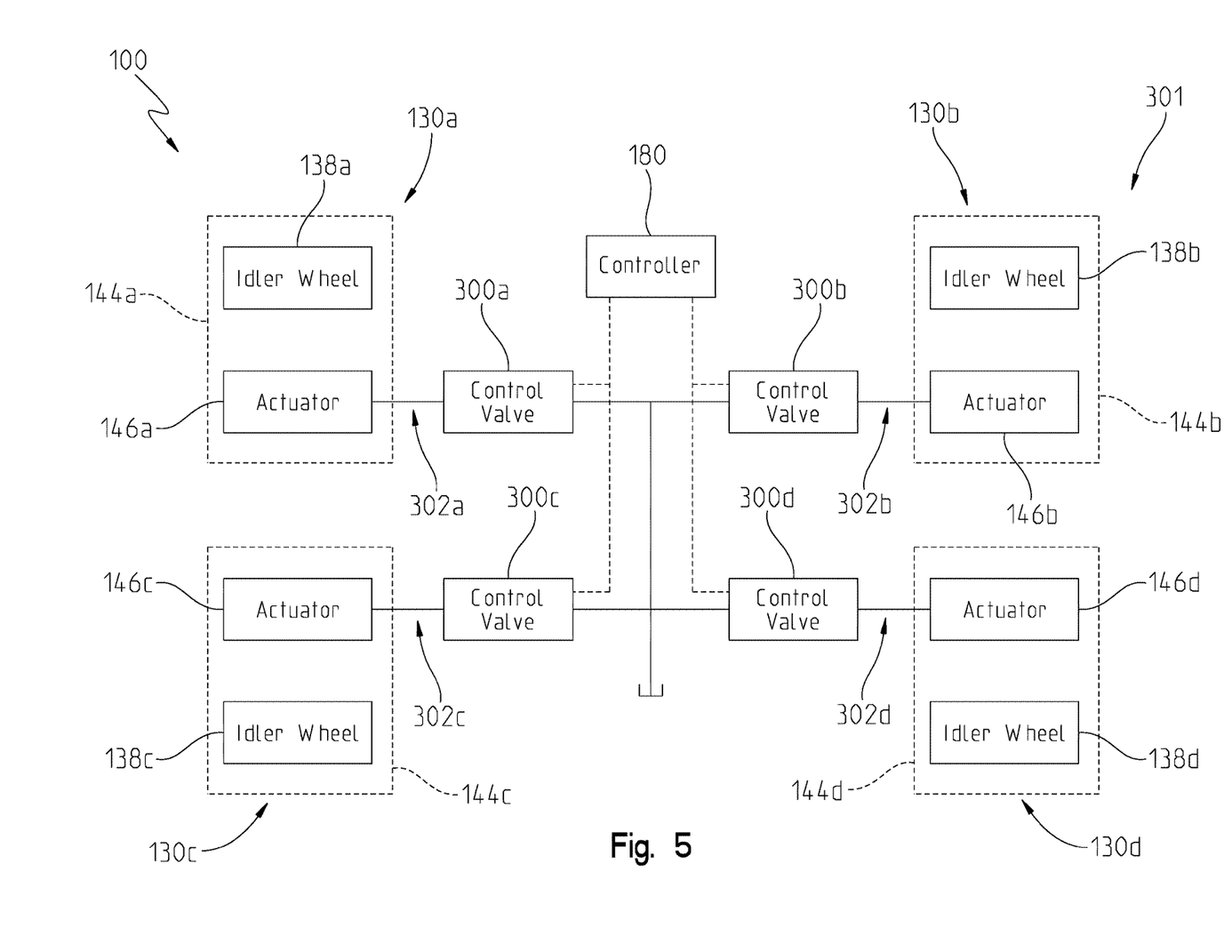
FIG. 5 illustrates a diagrammatic view of another electrohydraulic system for the work machine.

As shown in FIG. 5, the work machine 100 may include another electrohydraulic arrangement 301. The controller 180 is electrically coupled to control valves 300a-d. Each control valve 300a-d is fluidly coupled to a corresponding actuator 146a-d. Each actuator 146a-d is coupled to a corresponding idler wheel 138a-d, and each idler wheel 138a-d is engage with a corresponding drivable track 144a-d. As suggested in FIG. 5, each drive assembly 130a-d is associated with a corresponding hydraulic circuit 302a-d, and each hydraulic circuit 302a-d is isolatable from every other hydraulic circuit 302a-d, at least via the control valves 300a-d. In some embodiments, each hydraulic circuit 302a-d further includes check valves to isolate the circuits from one another and to prevent or allow flow from the control valves 300a-d to the corresponding actuators 146a-d.

In use, each control valve 300a-d receives an electrical signal from the controller 180 which causes the control valve 300a-d to open or close (or partially open or close) based on the electrical signal. Each electrical signal corresponds to a target pressure. Thus, each actuator 146a-d may be controlled to a different target pressure. The pressure of each actuator 146a-d may be increased or decreased to the target pressure associated with the corresponding control valve 300a-d. The increase or decrease in the pressure of the actuator 146a-d causes the actuator 146a-d to extend or retract which moves the corresponding idler wheel 138a-d from a first position to a second position. Movement of the idler wheel 138a-d from the first position to the second position causes an increase or decrease in the tension of the corresponding drivable track 144a-d.

Figure 6:
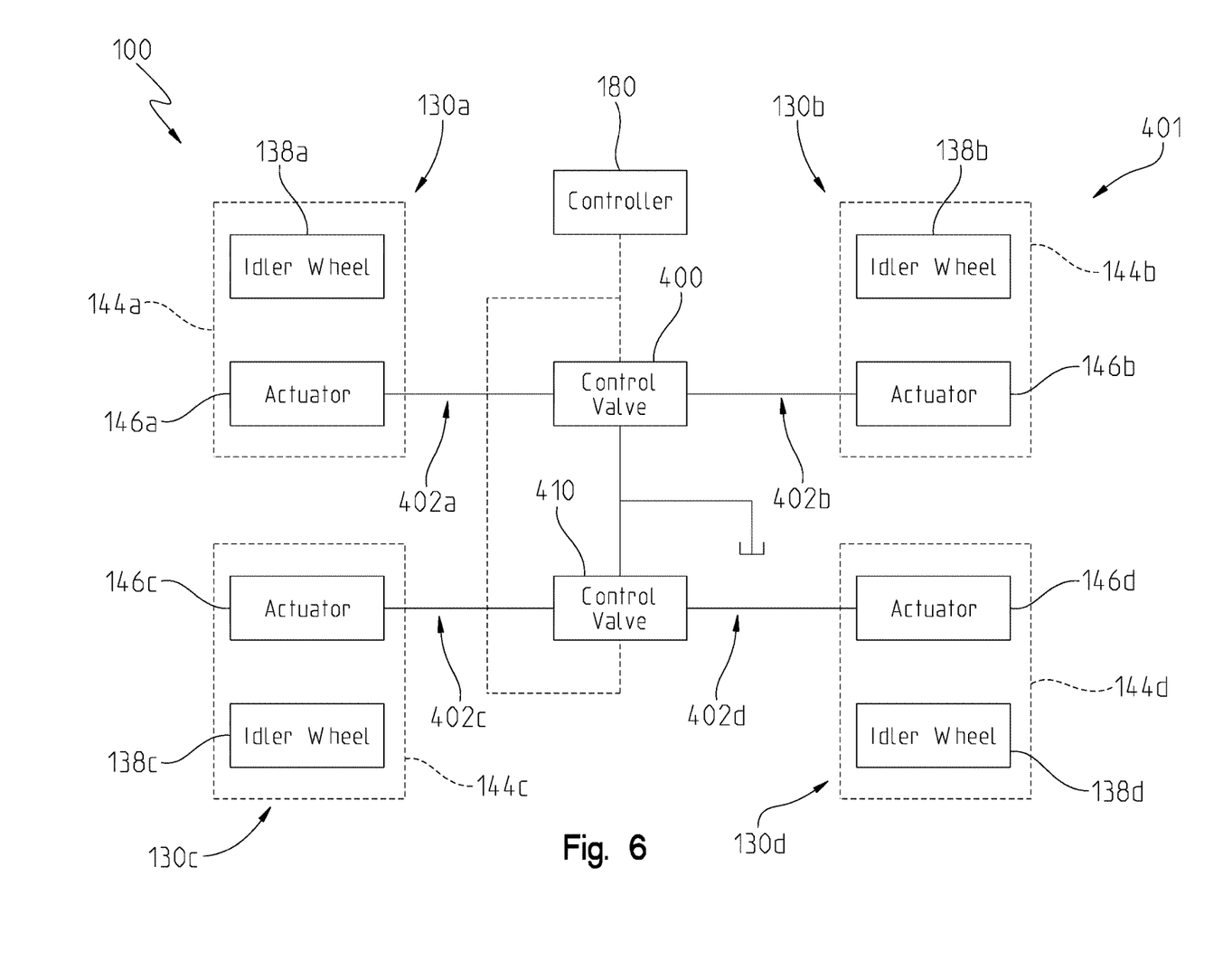
FIG. 6 illustrates a diagrammatic view of another electrohydraulic system for the work machine.

As shown in FIG. 6, the work machine 100 may include another electrohydraulic arrangement 401. The controller 180 is electrically coupled to control valves 400 and 410. The control valve 400 is fluidly coupled to the actuators 146a, 146b, and the control valve 410 is fluidly coupled to the actuators 146c, 146d. Each actuator 146a-d is coupled to a corresponding idler wheel 138a-d, and each idler wheel 138a-d is engage with a corresponding drivable track 144a-d. As suggested in FIG. 6, each drive assembly 130a-d is associated with a corresponding hydraulic circuit 402a-d, and each hydraulic circuit 402a-d is isolatable from other hydraulic circuits 402a-d, at least via the control valves 400, 410. In some embodiments, each hydraulic circuit 402a-d further includes check valves to isolate the circuits from one another and to prevent or allow flow from the control valves 400, 410 to the corresponding actuators 146a-b, 146c-d, respectively. The check valves may be positioned in the hydraulic line between a control valve and an actuator for each respective hydraulic circuit 402a-d.

In use, each control valve 400, 410 receives an electrical signal from the controller 180 which causes the control valve 400, 410 to open or close (or partially open or close) based on the electrical signal. Each electrical signal corresponds to a target pressure. Thus, the actuators 146a-b may be controlled to a different target pressure than the actuators 146c-d. The pressure of each actuator 146a-d may be increased or decreased to the target pressure associated with the corresponding control valve 400 or 410. The increase or decrease in the pressure of the actuator 146a-d causes the actuator 146a-d to extend or retract which moves the corresponding idler wheel 138a-d from a first position to a second position. Movement of the idler wheel 138a-d from the first position to the second position causes an increase or decrease in the tension of the corresponding drivable track 144a-d.

The controller 180 may include a memory and a processor configured to execute instructions (i.e. algorithmic steps) stored on the memory. The controller 180 may be a single controller or a plurality of controllers operatively coupled to one another. The controller 180 may be hardwired or connected wirelessly to other components of the electrohydraulic system via Wi-Fi, Bluetooth, or other known means of wireless communication. The controller 180 may be housed by the work machine 100 or positioned remotely, away from the work machine 100.

The controller 180 may be coupled to an engine control unit (ECU) or sensors associated with the engine 120 to receive signals indicative of the speed of the work machine 100 and the tractive load on the work machine 100. The speed of the work machine 100 may be a speed of forward movement, rearward movement, or movement in any other direction of travel. The tractive load of the work machine is the load that the work machine 100 is propelling during travel. The tractive load of the work machine 100 is associated with the term tractive force, which is the force used by the work machine 100 to generate motion between the work machine 100 and the ground.

The controller 180 may be operatively coupled to a user interface configured to receive input data or instructions from the user. For example, a user may input data associated with the mass of the drivable track 144. The input data may include the mass of the drivable track 144 or some other input associated with the mass of the drivable track 144 (e.g., the width, composition, or part number of the drivable track 144).

The user may also input data associated with the geometry of the drivable track 144, which may be different for different machines, models, or applications. For example, a linear span 182 of the drive track 144 (see FIG. 2) is defined between the rear idler wheel 140 and the drive sprocket 136, and in various arrangements, the linear span 182 may vary in length resulting in different geometries of the drivable track 144. For example, an additional component (not shown in FIG. 2) may engage the drivable track 144 and thereby reduce the length of the linear span 182. In other words, the linear span 182 may be divided into a first linear span and a second linear span, such that the drivable track 144 is shaped as a quadrilateral rather than as a triangle shown in FIG. 2. In any event, the user may input data associated with the geometry of the drivable track 144 via the user interface.

In some embodiments, the controller 180 may determine the mass of the drivable track 144 and/or the geometry of the drivable track 144 automatically, without input by the user. For example, sensors may determine the geometry and/or mass of the drivable track 144, and the sensors may send signals to the controller 180 indicative thereof. In some embodiments, the user may input data associated with the speed of the work machine 100 and/or the tractive load of the work machine 100.

In any event, the controller 180 is configured to identify, determine, or receive signals indicating several properties or variables of the work machine 100, including: (i) the geometry of the drivable track 144, (ii) the mass of the drivable track 144, (iii) the tractive load on the work machine 100; and (iv) the speed of the work machine 100. The properties or variables of the work machine 100 may be referred to as harmonizing variables, which will be described in greater detail below.

As described above, the pressure of the actuator 146 is associated with a degree of tension on the drivable track 144. At some pressures of the actuator 146 (and some associated degrees of tension of the drivable track 144), there exists one or more combinations of values of the harmonizing variables, which when presented, cause the work machine 100 to vibrate or resonate. This vibration or resonance is often undesirable. The pressure at which the vibration or resonance occurs is referred to herein as a critical pressure. The critical pressure of the work machine 100 may vary based on harmonizing variables including the (i) the geometry of the drivable track 144, (ii) the mass of the drivable track 144, (iii) the tractive load on the work machine 100; and (iv) the speed of the work machine 100, among others.

In a calibrating process, when one or more of the geometry of the drivable track 144, the mass of the drivable track 144, the tractive load on the work machine 100, and the speed of the work machine 100 are known, the pressure of the actuator 146 may be adjusted to determine the critical pressure of the actuator 146 based on the known value of each harmonizing variable. This process can be performed (or extrapolated for) at every possible speed of the work machine 100, every possible tractive load of the work machine 100, every possible mass of the work machine 100, and every possible geometry of the drivable track 144. Thus, all critical pressures of the work machine 100 may be determined based on the known harmonizing variables.

In some embodiments, only one or more of the exemplary harmonizing variables listed above are identifiable, and the method includes determining one or more critical pressures of the actuator 146 based on the identifiable harmonizing variables. In any event, all but one of the identifiable harmonizing variables are held constant, and one harmonizing variable is adjusted to determine the critical pressure of the actuator 146 at each condition. This calibrating process may be repeated for each identified harmonizing variable to determine the critical pressure for the work machine 100, at each condition, based on the identified harmonizing variables.

In use, the controller 180 determines the critical pressure(s) based on one or more identified harmonizing variables. The controller 180 actively (i.e. automatically and continuously, as necessary) adjusts the pressure of the actuator 146 to a target pressure different than the determined critical pressure. For example, for a given tractive load, a given mass of the drivable track 144, and a given geometry of the drivable track 144, the critical pressure may be achieved at a speed of 5 miles/hour (5 mph). Therefore, as the work machine 100 approaches a speed of 5 mph, the controller 180 adjusts the pressure of the actuator 146 to the target pressure, which is different than the critical pressure.

Adjusting the pressure extends or retracts the actuator 146 which adjusts the tension of the drivable track 144. Adjusting the tension in the drivable track 144 prevents or stops the drivable track 144 from vibrating or resonating at the given speed, load, mass, and geometry. Thus, the pressure of the actuator 146 (and the tension of the drivable track 144) is adjusted based on at least one identified harmonizing variable to prevent vibrations of the work machine 100 which occur at the critical pressure.

It should be appreciated that, at some conditions, the target pressure may be greater than the critical pressure while, at other conditions the target pressure may be less than the critical pressure. Thus, the controller 180 may increase or decrease the pressure in each (or in any one) actuator 146a-d to adjust the pressure toward to the target pressure to prevent vibrations of the work machine 100 associated with the critical pressure.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work machine comprising:
a first idler wheel;
a drivable track engaged with the first idler wheel;
an actuator coupled to the first idler wheel and configured to move the first idler wheel between a first position in which the drivable track experiences a first tension and a second position in which the drivable track experiences a second tension different than the first tension; and
a controller configured to receive signals indicative of: a geometry of the drivable track, a mass of the drivable track, a tractive load on the work machine, and a speed of the work machine;
wherein the controller is configured to determine whether the actuator is at a critical pressure based on the received signals indicative of: the geometry of the drivable track, the mass of the drivable track, the tractive load on the work machine, and the speed of the work machine;
wherein the critical pressure is a pressure at which vibrations of the work machine are induced; and
wherein, in response to determining that the actuator is at the critical pressure, the controller is configured to send a signal causing movement of the actuator such that the pressure of the actuator is adjusted to be different than the critical pressure.

2. The work machine of claim 1, further comprising:
a second idler wheel positioned rearwardly of the first idler wheel; and
a drive sprocket positioned above the first and second idler wheels;
wherein the drivable track is engaged with the drive sprocket and the second idler wheel; and
wherein the actuator is configured to move the first idler wheel relative to the drive sprocket and the second idler wheel.

3. The work machine of claim 1, further comprising a pressure sensor configured to measure the pressure of the actuator; and
wherein the controller is configured to receive a signal from the pressure sensor indicative of the pressure of the actuator.

4. The work machine of claim 3, further comprising a pressure control valve electrically coupled to the controller and configured to adjust the pressure of the actuator;
wherein the controller is configured to send a signal to the pressure control valve to adjust the pressure of the actuator to a target pressure that is different from the critical pressure; and
wherein the actuator is at the target pressure when the first idler wheel is in the second position.

5. A work machine comprising:
a drive assembly including:
a first idler wheel:
a drivable track engaged with the first idler wheel; and
an actuator coupled to the first idler wheel and configured to move the first idler wheel through a range of positions, wherein each position of the first idler wheel is associated with a different tension of the drivable track; and
a controller configured to determine a critical pressure of the actuator, at which vibrations of the work machine are induced, based on received signals for two or more variables from the group consisting of: a geometry of the drivable track, a mass of the drivable track, a tractive load on the work machine, and a speed of the work machine;
wherein the controller is configured to adjust the actuator to a pressure that is different from the critical pressure.

6. The work machine of claim 5, wherein the controller is configured to determine the critical pressure of the actuator based on received signals for three of the two or more variables from the group consisting of: the geometry of the drivable track, the mass of the drivable track, the tractive load on the work machine, and the speed of the work machine.

7. The work machine of claim 5, wherein the controller is configured to determine the critical pressure of the actuator based on received signals for all of the two or more variables from the group consisting of: the geometry of the drivable track, the mass of the drivable track, the tractive load on the work machine, and the speed of the work machine.

8. A method of operating a work machine comprising:
measuring a pressure of an actuator configured to move an idler wheel that is engaged with a drivable track of the work machine;
determining, via a controller, at least two variables from the group consisting of: a geometry of the drivable track, a mass of the drivable track, a tractive load on the work machine, and a speed of the work machine;
determining, via the controller, for the at least two determined variables, a critical pressure of the actuator;
wherein at the critical pressure of the actuator vibrations of the work machine are induced; and
adjusting the pressure of the actuator to be different from the critical pressure.

9. The method of claim 8, wherein determining, via the controller, at least two variables includes: determining the speed of the work machine and the tractive load on the work machine; and
wherein determining the critical pressure of the actuator includes: determining the critical pressure of the actuator at the determined speed of the work machine and the determined tractive load on the work machine.

10. The method of claim 9, wherein determining, via the controller, at least two variables includes: determining the mass of the drivable track in addition to the speed of the work machine and the tractive load on the work machine; and
wherein determining the critical pressure of the actuator includes: determining the critical pressure of the actuator at the determined speed of the work machine, the determined tractive load on the work machine, and the determined mass of the drivable track.

11. The method of claim 8, wherein determining, via the controller, at least two variables includes: determining the speed of the work machine and the mass of the drivable track; and
wherein determining the critical pressure of the actuator includes: determining the critical pressure of the actuator at the determined speed of the work machine and the determined mass of the drivable track.

12. The method of claim 8, wherein determining, via the controller, at least two variables includes: determining the geometry of the drivable track in addition to determining the speed of the work machine and the mass of the drivable track; and
wherein determining the critical pressure of the actuator includes: determining the critical pressure of the actuator at the determined speed of the work machine, the determined mass of the drivable track, and the determined geometry of the drivable track.

13. The method of claim 8, wherein determining, via the controller, at least two variables includes: determining the speed of the work machine and the geometry of the drivable track; and
wherein determining the critical pressure of the actuator includes: determining the critical pressure of the actuator at the determined speed of the work machine and the determined geometry of the drivable track.

14. The method of claim 13, wherein determining, via the controller, at least two variables includes: determining the tractive load on the work machine in addition to determining the speed of the work machine and the geometry of the drivable track; and
wherein determining the critical pressure of the actuator includes: determining the critical pressure of the actuator at the determined speed of the work machine, the determined geometry of the drivable track, and the determined tractive load on the work machine.

15. The method of claim 8, wherein determining, via the controller, at least two variables includes: determining the tractive load on the work machine and the mass of the drivable track; and
wherein determining the critical pressure of the actuator includes: determining the critical pressure of the actuator at the determined tractive load on the work machine and the determined mass of the drivable track.

16. The method of claim 15, wherein determining, via the controller, at least two variables includes: determining the geometry of the drivable track in addition to the tractive load on the work machine and the mass of the drivable track; and
wherein determining the critical pressure of the actuator includes: determining the critical pressure of the actuator at the determined tractive load on the work machine, the determined mass of the drivable track, and the determined geometry of the drivable track.

17. The method of claim 16, wherein determining, via the controller, at least two variables includes: determining the speed of the work machine in addition to the geometry of the drivable track, the tractive load on the work machine, and the mass of the drivable track; and
wherein determining the critical pressure of the actuator includes: determining the critical pressure of the actuator at the determined tractive load on the work machine, the determined mass of the drivable track, the determined geometry of the drivable track, and the determined speed of the work machine.

18. The method of claim 8, wherein determining, via the controller, at least two variables includes: determining the geometry of the drivable track and the mass of the drivable track; and
wherein determining the critical pressure of the actuator includes: determining the critical pressure of the actuator at the determined geometry of the drivable track and the determined mass of the drivable track.

19. The method of claim 8, wherein determining, via the controller, at least two variables includes: determining the geometry of the drivable track and the tractive load on the work machine; and
wherein determining the critical pressure of the actuator includes: determining the critical pressure of the actuator at the determined the geometry of the drivable track and the determined the tractive load on the work machine.

* * * * *